(12) United States Patent
Sanchez et al.

(10) Patent No.: US 7,124,323 B2
(45) Date of Patent: Oct. 17, 2006

(54) METHOD, SYSTEM, AND PROGRAM FOR RECOVERY OF A REVERSE RESTORE OPERATION

(75) Inventors: Matthew Sanchez, Tucson, AZ (US); Theresa Mary Brown, Tucson, AZ (US); Sam Clark Werner, Tucson, AZ (US); Gail Andrea Spear, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 646 days.

(21) Appl. No.: 10/465,069

(22) Filed: Jun. 18, 2003

(65) Prior Publication Data

US 2004/0260897 A1    Dec. 23, 2004

(51) Int. Cl.
*G06F 11/00* (2006.01)
(52) U.S. Cl. .............. 714/19; 714/16; 714/21
(58) Field of Classification Search ............... 714/21, 714/16, 19, 20
See application file for complete search history.

(56) References Cited

U.S. PATENT DOCUMENTS

| | | | | |
|---|---|---|---|---|
| 5,870,761 | A * | 2/1999 | Demers et al. ............. | 707/201 |
| 5,893,155 | A * | 4/1999 | Cheriton .................... | 711/144 |
| 5,922,078 | A * | 7/1999 | Hirayama et al. ............ | 714/16 |
| 6,029,255 | A * | 2/2000 | Yamada ........................ | 714/16 |
| 6,397,352 | B1 * | 5/2002 | Chandrasekaran et al. ..... | 714/16 |
| 6,647,510 | B1 * | 11/2003 | Ganesh et al. ................ | 714/16 |
| 6,745,303 | B1 * | 6/2004 | Watanabe .................... | 711/161 |
| 2002/0016827 | A1 * | 2/2002 | McCabe et al. ............. | 709/213 |
| 2002/0116457 | A1 * | 8/2002 | Eshleman et al. .......... | 709/203 |
| 2002/0133507 | A1 * | 9/2002 | Holenstein et al. ......... | 707/200 |
| 2002/0174108 | A1 * | 11/2002 | Cotner et al. ................... | 707/3 |
| 2004/0010663 | A1 * | 1/2004 | Prabhu ........................ | 711/143 |
| 2004/0039962 | A1 * | 2/2004 | Ganesh et al. ................ | 714/16 |
| 2004/0254964 | A1 * | 12/2004 | Kodama et al. ............ | 707/204 |
| 2004/0260895 | A1 * | 12/2004 | Werner et al. .............. | 711/162 |
| 2005/0166091 | A1 * | 7/2005 | Boylan et al. ................ | 714/19 |
| 2005/0216608 | A1 * | 9/2005 | Wang et al. .................... | 710/22 |

OTHER PUBLICATIONS

EMC Corporation, "EMC TimeFinder: Create Mirror Images of Active Production Data." [online] © EMC Corporation, [Retrieved on May 13, 2003], retrieved from the Internet at <URL: http://www.emc.com/products/software/timefinder.jsp.>.
EMC Corporation, "EMC TimeFinder: Data Sheet", [online], © 2003 EMC Corporation, [Retrieved on May 13, 2003], retrieved from the Internet at <URL: http://www.emc.com/products/product_pdfs/ds/timefinder_1700-4.pdf>.

(Continued)

*Primary Examiner*—Scott Baderman
*Assistant Examiner*—Loan Truong
(74) *Attorney, Agent, or Firm*—Janaki K. Davda; Konrad Raynes & Victor LLP

(57) ABSTRACT

Disclosed is a technique for processing interruption of an operation that transfers data between a source and a target. An indication that a reverse restore operation has been interrupted is received. It is determined whether designation of at least one of an original source and an original target has been reversed. The settings of one or more relation indicators are also determined. Processing to be performed is identified based on the determinations of whether designations have been reversed and based on the settings of the one or more relation indicators.

20 Claims, 12 Drawing Sheets

OTHER PUBLICATIONS

EMC Corporation, "EMC TimeFinder Product Description Guide", [online], © 1998 EMC Corporation, pp. 1-32, [Retrieved on May 13, 2003], retrieved from the Internet at <URL: http://www.emc.com/products/product_pdfs/pdg/timefinder_pdg.pdf>.

Hitachi Data Systems Corporation, "CARE-the *Copy* suite", [online] © 1999 Hitachi Data Systems Corporation, [Retrieved on May 13, 2003], retrieved from the Internet at <URL: http://www.hds.com/pdf/shadowim_flyer.pdf>.

Hitachi Data Systems Corporation, "NanoCopy", [online] © 2001 Hitachi Data Systems Corporation, [Retrieved on May 13, 2003], retrieved from the Internet at <URL: http://www.hds.com/pdf/hitachinano.pdf>.

Storage Technology Corporation, "StorageTek SnapShot", [online] © 2001 Storage Technology Corporation, [Retrieved on May 13, 2003], retrieved from the Internet at <URL: http://www.storagetek.com/prodserv/pdfs/SnapShot.ms2010be-pBR06_01.pdf>.

U.S. Appl. No. 09/347,344, filed Jul. 2, 1999, entitled "Method, System, and Program for Maintaining Electronic Data as of a Point-in-Time", invented by W. F. Micka, Y. Novick, & D. M. Shackelford.

U.S. Appl. No. 10/464,918, filed Jun. 18, 2003, entitled "Method, System, and Program for Reverse Restore of an Incremental Virtual Copy", invented by S. C. Werner, W. F. Micka, T. M. Brown, M. Sanchez, S. Tal, I. Nuriel, S. Rahav, G. A. Spear, W. K. Stanley, T. C. Jarvis, A. Hayardeny, S. Fienblit, R. M. Matosevich, S. Shukevich, & D. Tzafrir.

U.S. Appl. No. 10/465,118, filed Jun. 18, 2003, entitled "Method, System, and Program for Incremental Virtual Copy", invented by W. K. Stanley, W. F. Micka, S. C. Werner, S. Tal, G. A. Spear, T. M. Brown, M. Sanchez, S. Rahav, T. C. Jarvis, A. Hayardeny, D. Tzafrir, S. Fienblit, R. M. Matosevich, S. Shukevich, & I. Nuriel.

\* cited by examiner

| Row | Volume A Source or Target | Volume A Currently Set Relation Indicators | Volume B Source or Target | Volume B Currently Set Relation Indicators | Recovery Action |
|---|---|---|---|---|---|
| 1 | Source | --- | Target | --- | No action required. |
| 2 | Source | --- | Source | TRIP Indicator Set and New Source Toggle Indicator Set | Roll back. Make Volume B a Target Volume. |
| 3 | Target | SRIP Indicator Set and New Target Toggle Indicator Set | Source | TRIP Indicator Set and New Source Toggle Indicator Set | Roll forward, starting at block 430. |
| 4 | Target | SRIP Indicator Set and New Target Toggle Indicator Set | Source | TRIP Indicator Set | Roll forward, starting at block 440. |
| 5 | Target | SRIP Indicator Set | Source | TRIP Indicator Set | Roll forward, starting at block 450. |
| 6 | Target | SRIP Indicator Set and Merge Complete Indicator Set | Source | TRIP Indicator Set | Roll forward, starting at block 460. |
| 7 | Target | --- | Source | TRIP Indicator Set | Roll forward, starting at block 470. |
| 8 | Target | --- | Source | --- | No action required. |

FIG. 9

METHOD, SYSTEM, AND PROGRAM FOR RECOVERY OF A REVERSE RESTORE OPERATION

CROSS-REFERENCE TO RELATED APPLICATIONS

This application is related to the following commonly assigned and co-pending U.S. patent applications:

U.S. patent application Ser. No. 10/464,918, entitled "METHOD, SYSTEM, AND PROGRAM FOR REVERSE RESTORE OF AN INCREMENTAL VIRTUAL COPY," by S. Werner, et al.; and U.S. patent application Ser. No. 10/465,118, entitled "METHOD, SYSTEM, AND PROGRAM FOR INCREMENTAL VIRTUAL COPY," by S. Werner et al.;

each of which is filed on the same date herewith, and which is incorporated by reference herein in its entirety.

BACKGROUND OF THE INVENTION

1. Field of the Invention

The present invention is directed to recovery of a reverse restore operation.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives connected in a loop architecture, otherwise referred to as a Direct Access Storage Device (DASD). Hosts may communicate Input/Output (I/O) requests to the storage space through the storage controller.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "instant virtual copy" operations, also referred to as "fast replicate functions." Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

One such instant virtual copy operation is known as a FlashCopy® operation. A FlashCopy® operation involves establishing a logical point-in-time relationship between source and target volumes on the same or different devices. The FlashCopy® operation guarantees that until a track in a FlashCopy® relationship has been hardened to its location on the target disk, the track resides on the source disk. A relationship table is used to maintain information on all existing FlashCopy® relationships in the subsystem. During the establish phase of a FlashCopy® relationship, one entry is recorded in the source and target relationship tables for the source and target that participate in the FlashCopy® being established. Each added entry maintains all the required information concerning the FlashCopy® relationship. Both entries for the relationship are removed from the relationship tables when all FlashCopy® tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the FlashCopy® relationship have not yet been copied over and are thus protected tracks. Each track in the target device is represented by one bit in the bitmap. The target bit is set when the corresponding track is established as a target track of a FlashCopy® relationship. The target bit is reset when the corresponding track has been copied from the source location and destaged to the target device due to writes on the source or the target device, or a background copy task.

In the prior art, as part of the establishment of the logical point-in-time relationship during the FlashCopy® operation, all tracks in the source cache that are included in the FlashCopy® relationship must be destaged to the physical source volume, e.g., source DASD, and all tracks in the target cache included in the FlashCopy® must be discarded. Further details of the FlashCopy® operations are described in the copending and commonly assigned U.S. patent application Ser. No. 09/347,344, filed on Jul. 2, 1999, entitled "Method, System, and Program for Maintaining Electronic Data as of a Point-in-Time", which patent application is incorporated herein by reference in its entirety.

Once the logical relationship is established, hosts may then have immediate access to data on the source and target volumes, and the data may be copied as part of a background operation. A read to a track that is a target in a FlashCopy® relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FlashCopy® operation. Further, any destages to tracks on the source device that have not been copied over triggers a destage intercept, which causes the tracks on the source device to be copied to the target device.

Instant virtual copy techniques have been developed, at least in part, to quickly create a duplicate copy of data without interrupting or slowing foreground processes. Instant virtual copy techniques, such as a FlashCopy® operation, provide a point-in-time copy tool. Instant virtual copy techniques may be used for a variety of applications, including, for example, data backup, data migration, data mining, testing, etc. For example, an instant virtual copy technique may be used for the creation of a physical "backup" copy of the source data, to aid in disaster recovery.

Although the instant virtual copy techniques are useful for copying large amounts of data, conventional instant virtual copy techniques may be improved.

SUMMARY OF THE INVENTION

Provided are a method, system, and program for processing interruption of an operation that transfers data between a source and a target. An indication that a reverse restore operation has been interrupted is received. It is determined whether designation of at least one of an original source and an original target has been reversed. The settings of one or more relation indicators are also determined. Processing to be performed is identified based on the determinations of whether designations have been reversed and based on the settings of the one or more relation indicators.

The described implementations of the invention provide a method, system, and program for processing an interrupt of a reverse restore operation that performs a reverse incremental virtual copy operation.

BRIEF DESCRIPTION OF THE DRAWINGS

Referring now to the drawings in which like reference numbers represent corresponding parts throughout:

FIG. 9 illustrates a table describing states and recovery actions in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

An incremental virtual copy operation is an enhancement to an instant virtual copy operation. With the incremental virtual copy operation, only the blocks of data that were updated on source and target volumes since the last copy operation (e.g., instant virtual copy operation) from the source volume to the target volume are copied. A reverse restore operation is an enhancement to an incremental virtual copy operation. With the reverse restore operation, updates may be made to a source or target volume of an instant virtual copy. Then, the changes from the original target volume may be applied back to a corresponding original source volume, making the original source volume a point-in-time copy of the original target volume.

Implementations of the invention provide recovery of a reverse restore operation. That is, when the reverse restore operation is interrupted by some type of error event (e.g., hardware and/or software failures), implementations of the invention provide recovery by either undoing the operation and restoring the status of data to its original state (e.g., by performing a roll back operation) or by completing the reverse restore operation (e.g., by performing a roll forward operation starting at a roll forward point). Implementations of the invention determine the processing to be performed based on whether designations of source and target have been reversed (e.g., an original source is designated as a new target and/or an original target is designated as a new source) and on the setting of one or more indicators, which will be referred to herein as "relation" indicators.

Figure 1A:
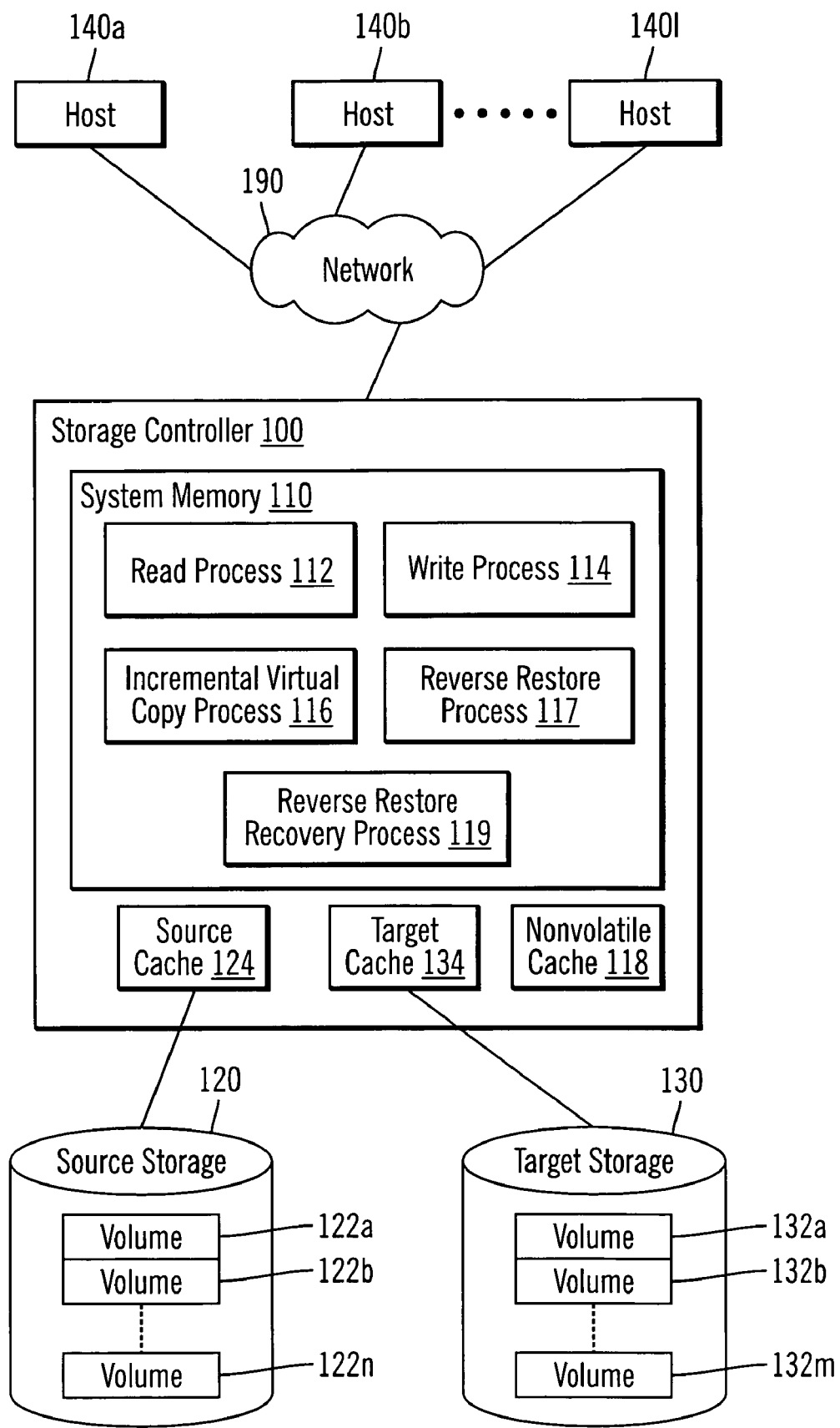
FIGS. 1A and 1B illustrate, in block diagrams, a computing environment in accordance with certain implementations of the invention.
Figures 1B, 2:
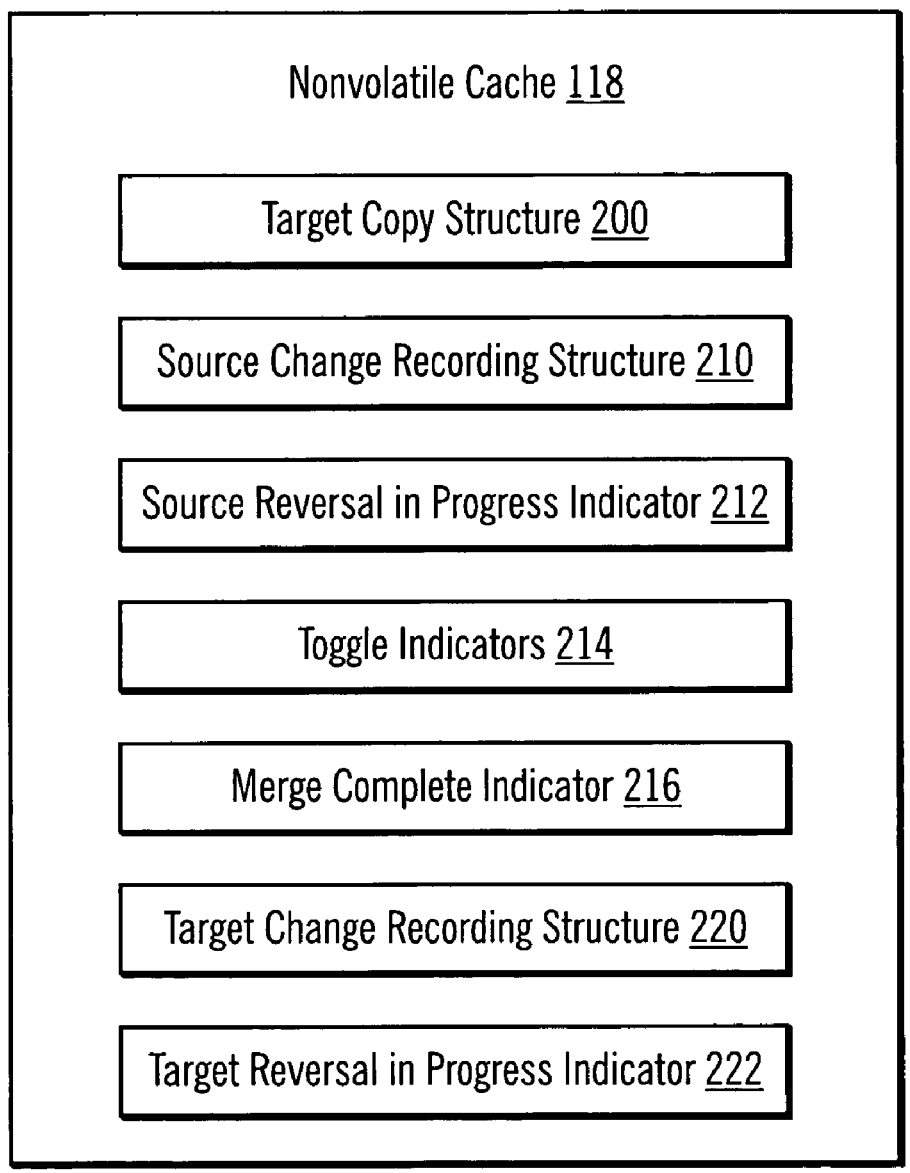
FIG. 2 illustrates various structures and indicators in accordance with certain implementations of the invention.

FIGS. 1A and 1B illustrate, in block diagrams, a computing environment in accordance with certain implementations of the invention. A storage controller 100 receives Input/Output (I/O) requests from hosts 140a,b, . . . l (wherein a, b, and l may be any integer value) over a network 190 directed toward storage devices 120, 130 configured to have volumes (e.g., Logical Unit Numbers, Logical Devices, etc.) 122a,b . . . n and 132a,b . . . m, respectively, where m and n may be different integer values or the same integer value. In certain implementations, the size of the target storage 130 may be larger than or equal to the source storage 120.

The source storage 120 includes one or more volumes 122a,b . . . n, which may be divided into blocks of storage 150 containing blocks of data, and the blocks of storage 150 are further divided into sub-blocks of storage (150a–150p, where a and p may be any integer value) that contain sub-blocks of data. A volume may be any logical or physical element of storage. In certain implementations, the blocks of data are contents of tracks, while the sub-blocks of data are contents of sectors of tracks.

Target storage 130 maintains copies of all or a subset of the volumes 122a,b . . . n of the source storage 120. Additionally, target storage 130 may be modified by, for example, host 140. Target storage 130 includes one or more volumes 132a,b . . . m, which may be divided into blocks of storage 150 containing blocks of data, and the blocks of storage 150 are further divided into sub-blocks of storage (150a–150p, where a and p may be any integer value) that contain sub-blocks of data. A volume may be any logical or physical element of storage. In certain implementations, the blocks of data are tracks, while the sub-blocks of data are sectors of tracks.

For ease of reference, the terms tracks and sectors will be used herein as examples of blocks of data and sub-blocks of data, but use of these terms is not meant to limit implementations of the invention to tracks and sectors. The implementations of the invention are applicable to any type of storage, block of storage or block of data divided in any manner. Moreover, although implementations of the invention refer to blocks of data, alternate implementations of the invention are applicable to sub-blocks of data.

The storage controller 100 includes a source cache 124 in which updates to tracks in the source storage 120 are maintained until written to source storage 120 (i.e., the tracks are destaged to physical storage). The storage controller 100 includes a target cache 134 in which updates to tracks in the target storage 130 are maintained until written to target storage 130 (i.e., the tracks are destaged to physical storage). The source cache 124 and target cache 134 may comprise separate memory devices or different sections of a same memory device. The source cache 124 and target cache 134 are used to buffer read and write data being transmitted between the hosts 140a,b . . . l, source storage 120, and target storage 130. Further, although caches 124 and 134 are referred to as source and target caches, respectively, for holding source or target blocks of data in a point-in-time copy relationship, the caches 124 and 134 may store at the same time source and target blocks of data in different point-in-copy relationships.

Additionally, the storage controller 100 includes a non-volatile cache 118. The non-volatile cache 118 may be, for example, a battery-backed up volatile memory, to maintain a non-volatile copy of data updates.

The storage controller 100 further includes system memory 110, which may be implemented in volatile and/or non-volatile devices. The system memory 110 includes a read process 112 for reading data, a write process 114 for writing data, an incremental virtual copy process 116, a reverse restore process 117, and a reverse restore recovery process 119. The read process 112 executes in system memory 110 to read data from storages 120 and 130 to caches 124 and 134, respectively. The write process 114 executes in system memory 110 to write data from caches 124 and 134 to storages 120 and 130, respectively. The incremental virtual copy process 116 executes in system memory 110 to perform an incremental virtual copy operation that transfers data from source storage 120 to target storage 130. The incremental virtual copy process is described further in the cross-referenced patent application "METHOD, SYSTEM, AND PROGRAM FOR INCREMENTAL VIRTUAL COPY," by S. Werner, et al., Ser. No. 10/465,118, which is incorporated herein in its entirety. The reverse restore process 117 executes in system memory 110 to perform a reverse restore operation that reverses the roles of the original source and original target and transfers data from the original target storage 130 to the original source storage 120. The reverse restore process is described further in the cross-referenced patent application "METHOD, SYSTEM, AND PROGRAM FOR REVERSE RESTORE OF AN INCREMENTAL VIRTUAL COPY," by S. Werner, et al., Ser. No. 10/464,918. The reverse restore recovery process 119 executes in system memory 110 to perform recovery operations for a reverse restore process 117 that is interrupted (e.g., by an error event).

In certain implementations of the invention, there may be multiple reverse restore recovery processes 119. In certain implementations of the invention, the reverse restore recovery process 119 may be executed at another storage controller connected to storage controller 100 instead of, or in addition to, execution at the storage controller 100. The system memory 110 may be in a separate memory devices from caches 124 and 134 or may share a memory device with one or both caches 124 and 134.

Implementations of the invention are applicable to the transfer of data between any two storage mediums, which for ease of reference will be referred to herein as source storage and target storage or as first storage and second storage. For example, certain implementations of the invention may be used with two storage mediums located at a single storage controller, as illustrated in FIG. 1A. Moreover, certain alternative implementations of the invention may be used with two storage mediums located at different storage controllers, different physical sites, etc. Also, for ease of reference, a block of data in source storage will be referred to as a "source block of data," and a block of data in target storage will be referred to as a "target block of data." When the indication of which storage is source storage and which storage is target storage is reversed, for ease of reference, the original "source block of data" will be referred to as the "new target block of data," and the original "target block of data" will be referred to as the "new source block of data."

In certain implementations, removable storage (instead of or in addition to target storage 130) may be used to maintain copies of all or a subset of the source storage 120, and the implementations of the invention transfer data to the removable storage rather than to the target storage. The removable storage may reside at the storage controller 100.

The storage controller 100 may further include a processor complex (not shown) and may comprise any storage controller or server known in the art, such as an Enterprise Storage Server® (ESS), 3990® Storage Controller, etc. The hosts 140a,b . . . l may comprise any computing device known in the art, such as a server, mainframe, workstatation, personal computer, hand held computer, laptop telephony device, network appliance, etc. The storage controller 100 and host system(s) 140a,b . . . l communicate via a network 190, which may comprise a Storage Area Network (SAN), a Source Area Network (LAN), Wide Area Network (WAN), the Internet, an Intranet, etc. The source storage 120 and target storage 130 may each comprise an array of storage devices, such as Direct Access Storage Devices (DASDs), Just a Bunch of Disks (JBOD), Redundant Array of Independent Disks (RAID), virtualization device, etc.

Additionally, although FIG. 1A illustrates a single storage controller, one skilled in the art would know that multiple storage controllers may be connected via a network (e.g., a Source Area Network (LAN), Wide Area Network (WAN), the Internet, etc.), and one or more of the multiple storage controllers may implement the invention.

When host 140 wishes to update a block of data in source storage 120, host 140 writes data to a block of storage in source cache 124. Write operations modify the block of storage in source cache 124 synchronously (i.e., writing host 140 waits for the operation to complete), and then, in a background process, source cache 124 content is written to source storage 120. A write operation may update data, write new data, or write the same data again. Writing data in source cache 124 to source storage 120 is called a destage operation. Copying all or a portion of a block of data from source storage 120 to source cache 124 is a staging operation. Likewise, data may be staged and destaged between target storage 130 and target cache 134. Moreover, data may be staged from source storage 120 to target cache 134.

FIG. 2 illustrates various structures 200, 210, and 220 and indicators 212, 214, 216, and 222 in accordance with certain implementations of the invention. Nonvolatile cache 118 includes a target copy structure 200. The target copy structure 200 may be used to determine whether to retrieve data from source storage 120 or target storage 130 to cache 124 or 134, respectively (i.e., for a staging operation). Additionally, the target copy structure 200 may be used to determine which blocks of data in source storage 120 are to be copied to target storage 130. The target copy structure 200 includes an indicator (e.g., a bit) for each block of data in, for example, a volume. When an indicator is set to a first value (e.g., one), the setting indicates that the block of data is to be retrieved from the source storage 120 for a staging operation or indicates that the block of data is to be copied to target storage 130 for a copy operation (e.g., a background physical copy operation). When an indicator is set to a second value (e.g., zero), the setting indicates that the block of data is to be retrieved from the target storage 130 for a staging operation or indicates that the block of data is not to be copied from source storage 120 to target storage 130 for a copy operation (e.g., a background physical copy operation).

A source change recording structure 210 is used to monitor updates to blocks of data within portions of data in the source storage 120 for which an incremental virtual copy relationship has been established. The source change recording structure 210 includes an indicator (e.g., a bit) for each block of data in the source storage 120 that is part of the incremental virtual copy relationship. When an indicator is set to a first value (e.g., one), the setting indicates that the block of data has been updated since the last copy operation (e.g., an incremental virtual copy operation or a reverse restore operation). When an indicator is set to a second value (e.g., zero), the setting indicates that the block of data has not been updated since the last copy operation (e.g., an incremental virtual copy operation or a reverse restore operation).

A target change recording structure 220 is used to monitor updates to blocks of data in the target storage 130 after an incremental virtual copy relationship has been established. The target change recording structure 220 includes an indicator (e.g., a bit) for each block of data in the target storage 130 that is part of the incremental virtual copy relationship. When an indicator is set to a first value (e.g., one), the setting indicates that the block of data has been updated since the last copy operation. When an indicator is set to a second value (e.g., zero), the setting indicates that the block of data has not been updated since the last copy operation.

In certain implementations of the invention, each structure 200, 210, and 220 comprises a bitmap, and each indicator comprises a bit. In each structure 200, 210, and 220, the nth indicator corresponds to the nth block of data (e.g., the first indicator in each structure 200, 210, and 220 corresponds to the first data block). Although the structures 200, 210, and 220 have been illustrated as three separate structures, the structures may be combined in any form without departing from the scope of the invention. In certain implementations of the invention, there is a copy of each structure for each volume. In certain alternative implementations of the invention, there is a single copy of each structure for all volumes. Moreover, although structures 210 and 220 are referred to as source and target, respectively, in the illustration, the designation of source and target may be changed when the storage 120 is to be treated as a target, while storage 130 is to be treated as a source.

A source reversal in progress indicator (SRIP) 212 is stored in nonvolatile cache 118 and is used to indicate whether or not a reverse restore operation is in progress for a source portion of data. Although the source reversal in progress indicator 212 is illustrated as being stored in nonvolatile cache 118, the source reversal in progress indicator 212 may be stored in nonvolatile cache 118 or elsewhere. In particular, when the source reversal in progress indicator 212 is set to a first value (e.g., one), the setting indicates that a reverse restore operation is in progress. When the source reversal in progress indicator 212 is set to a second value (e.g., zero), the setting indicates that a reverse restore operation is not in progress. A source reversal in progress indicator 212 is a type of relation indicator. When a reversal of source and target occurs, the source reversal in progress indicator 212 is associated with the original source (i.e., new target).

Moreover, the nonvolatile cache 118 stores toggle indicators 214 that indicate whether a toggle operation is pending for a portion of data in storage 120 or 130. In certain implementations of the invention, there is one toggle indicator for the source change recording structure and one toggle indicator for the target change recording structure (i.e., there is a toggle indicator per volume). Although the toggle indicator 214 is illustrated as being stored in nonvolatile cache 118, the toggle indicator 214 may be stored elsewhere. When the toggle indicator 214 is set to a first value (e.g., one), the setting indicates that a toggle operation is pending. When the toggle indicator 214 is set to a second value (e.g., zero), the setting indicates that a toggle operation is not pending. A toggle indicator 214 is a type of relation indicator. Each toggle operation resets the toggle indicators 214 for either the source or target change recording structure 210 or 220 to indicate that no changes have occurred since the last copy operation (e.g., an incremental virtual copy operation).

Additionally, the nonvolatile cache 118 stores a merge complete indicator 216 that indicates whether a merge of change recording structures 210 and 220 is complete. Although the merge complete indicator 216 is illustrated as being stored in nonvolatile cache 118, the merge complete indicator 216 may be stored in nonvolatile cache 118 or elsewhere. When the merge complete indicator 216 is set to a first value (e.g., one), the setting indicates that merging of the source and target change recording structures 210 and 220 is complete. When the merge complete indicator 216 is set to a second value (e.g., zero), the setting indicates that merging of the source and target change recording structures 210 and 220 is not complete. A merge complete indicator 216 is a type of relation indicator.

A target reversal in progress indicator (TRIP) 222 is stored in nonvolatile cache 118 and is used to indicate whether or not a reverse restore operation is in progress. Although the target reversal in progress indicator 222 is illustrated as being stored in nonvolatile cache 118, the target reversal in progress indicator 222 may be stored in nonvolatile cache 118 or elsewhere. In particular, when the target reversal in progress indicator 222 is set to a first value (e.g., one), the setting indicates that a reverse restore operation is in progress. When the target reversal in progress indicator 222 is set to a second value (e.g., zero), the setting indicates that a reverse restore operation is not in progress. A target reversal in progress indicator 222 is a type of relation indicator. When a reversal of source and target occurs, the target reversal in progress indicator 222 is associated with the original target (i.e., new source).

Figure 3:
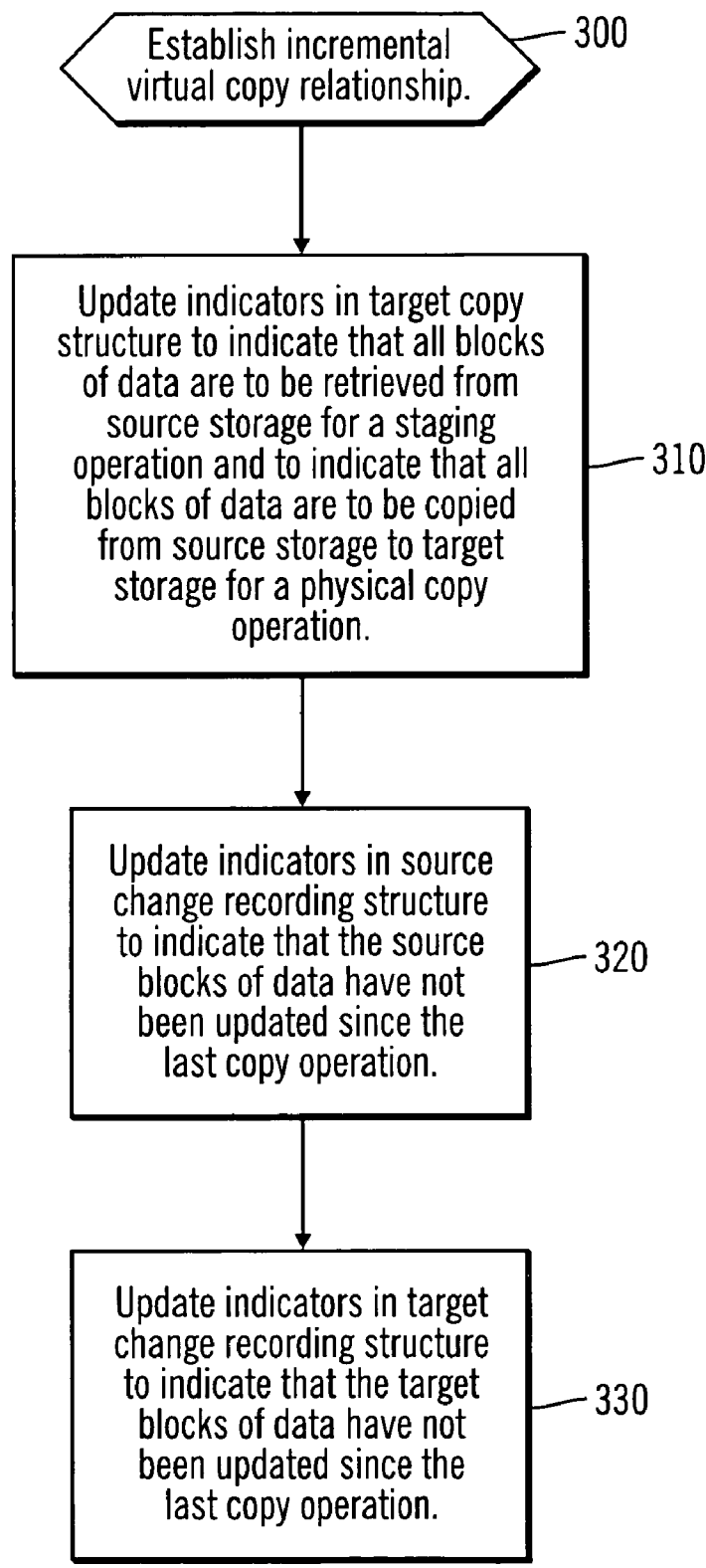
FIG. 3 illustrates logic for updating structures in accordance with certain implementations of the invention.

FIG. 3 illustrates logic implemented in the incremental virtual copy process 116 for updating structures in accordance with certain implementations of the invention. Control begins at block 300 with initial establishment of an incremental virtual copy relationship. The incremental virtual copy relationship is formed between one or more portions of data (e.g., source volumes) in the source storage 120 and corresponding portions of data (e.g., target volumes) in the target storage 130 when an incremental virtual copy operation is performed between the corresponding portions of data. The first incremental virtual copy operation may copy, for example, one or more source volumes to corresponding target volumes. Subsequent copies, however, may make incremental copies, avoiding re-copying any portions of source volumes that have not changed since the last copy operation.

In block 310, the incremental virtual copy process 116 updates indicators in the target copy structure 200 to indicate that all of the blocks of data corresponding to the indicators are to be retrieved from source storage for a staging operation and to indicate that all blocks of data are to be copied from source storage to target storage for a physical copy operation. In certain implementations of the invention, the indicators in the target copy structure 200 are set to one.

In block 320, the incremental virtual copy process 116 updates the indicators in the source change recording structure 210 to indicate that the source blocks of data corresponding to the indicators have not been updated since the last copy operation (e.g., incremental virtual copy operation). In certain implementations of the invention, all of the indicators in the source change recording structure 210 are set to zero. In block 330, the incremental virtual copy process 116 updates the indicators in the target change recording structure 220 to indicate that the target blocks of data corresponding to the indicators have not been updated since the last copy operation (e.g., incremental virtual copy operation). In certain implementations of the invention, all of the indicators in the target change recording structure 220 are set to zero.

Figure 4:
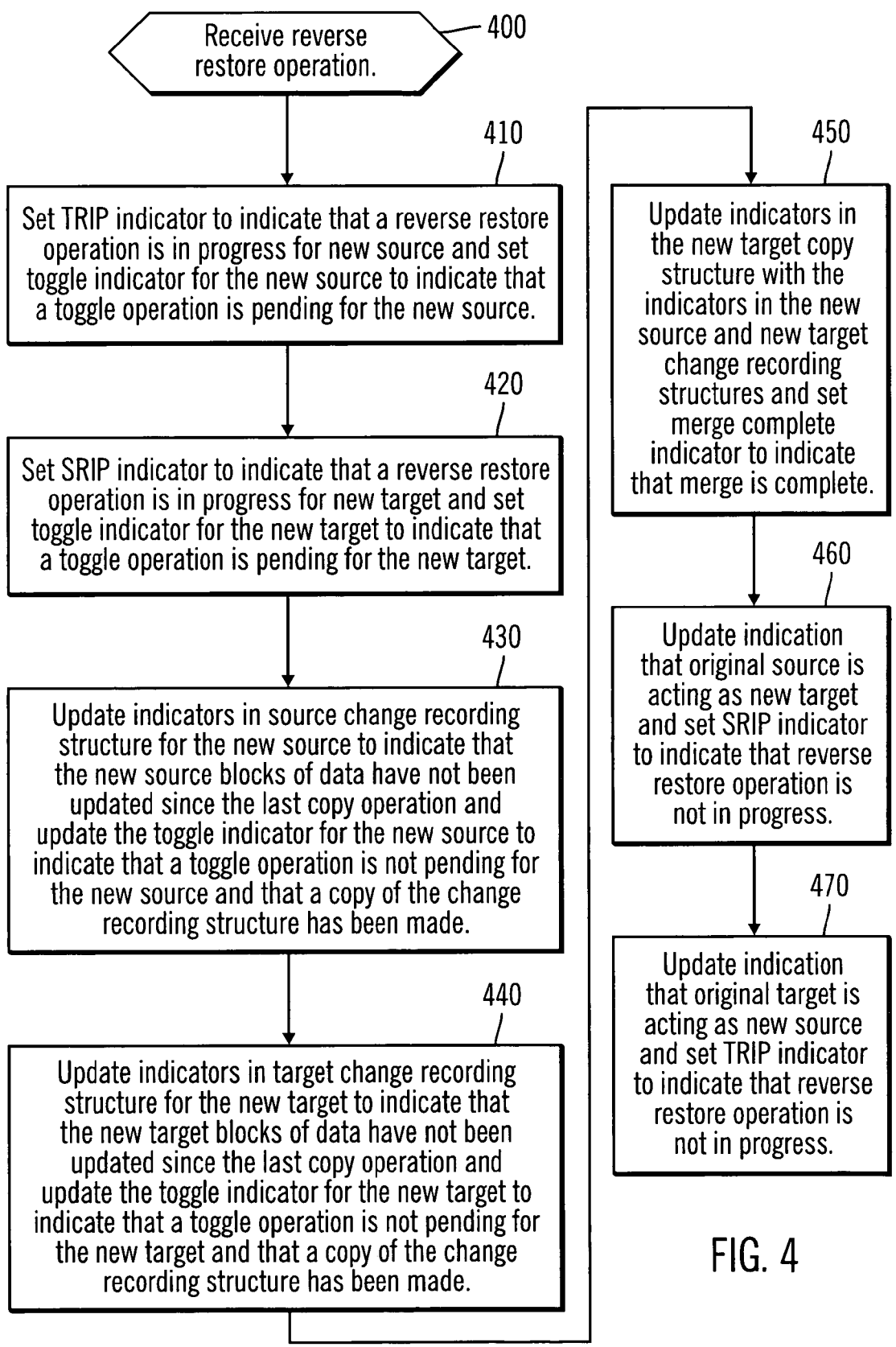
FIG. 4 illustrates logic implemented in the reverse restore process for performing an incremental virtual copy in accordance with certain implementations of the invention.

FIG. 4 illustrates logic implemented in the reverse restore process 117 for performing an incremental virtual copy in accordance with certain implementations of the invention. In the example illustrated with FIG. 4, storage 120 is initially designated as a source, and storage 130 is initially designated as a target. During the processing of logic in FIG. 4, the designations of source and target are reversed. In certain implementations of the invention, prior to execution of the reverse restore process 117, a physical copy has completed and the indicators in the target copy structure are set (e.g., to zero) to indicate that the blocks of data corresponding to the indicators are not to be copied for a copy operation. Control begins at block 400 with the reverse restore process 117 receiving a reverse restore operation. A reverse restore operation may be issued by host 140. Although not shown in the flow of FIG. 4, prior to receipt of the reverse restore copy operation, one or more blocks of data may have been updated in the source storage 120 and/or the target storage 130, by, for example, a user at host 140.

Figure 8A:
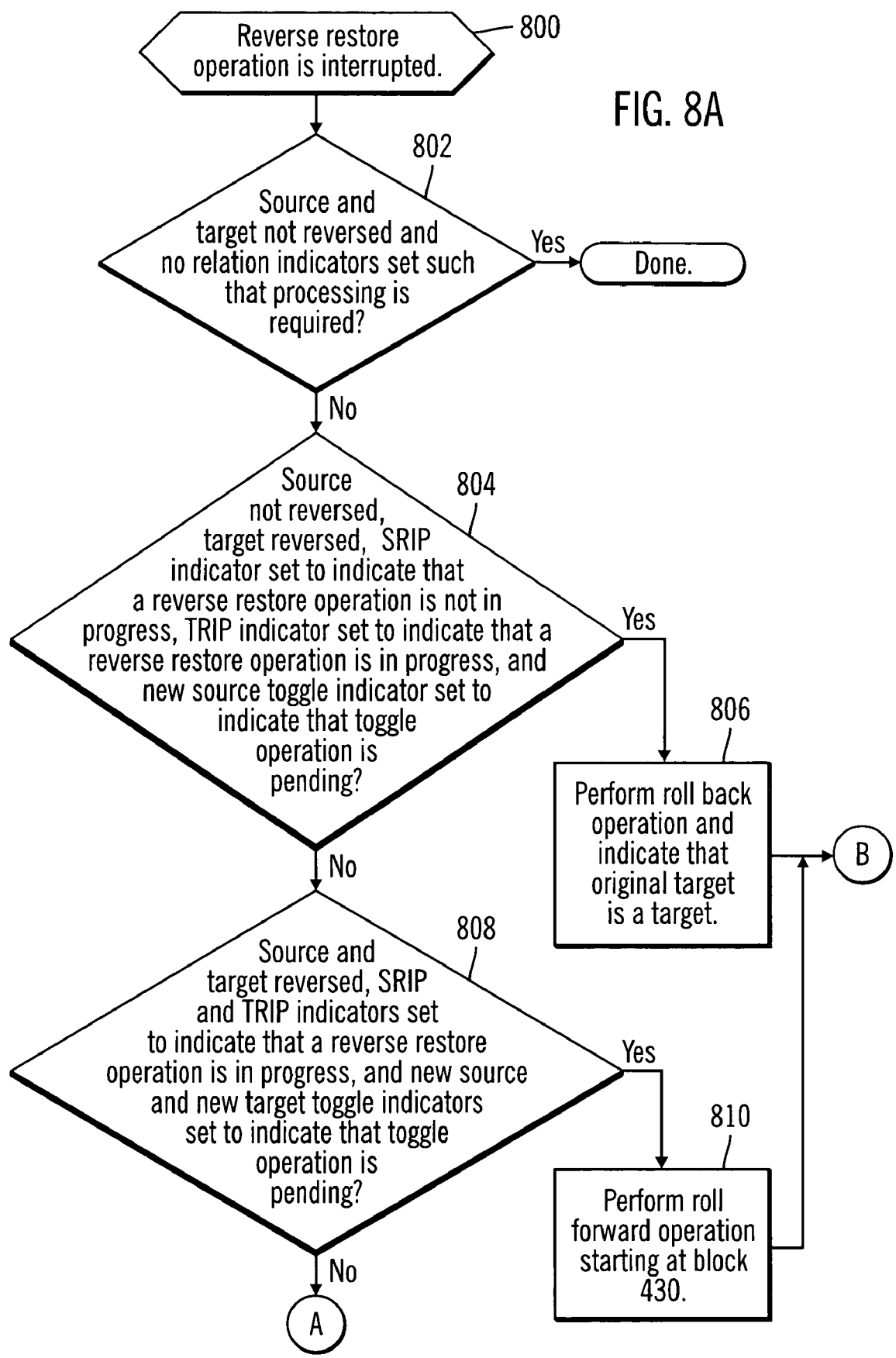
FIGS. 8A, 8B, and 8C illustrate logic implemented in a reverse restore recovery process in accordance with certain implementations of the invention.
Figure 8B:
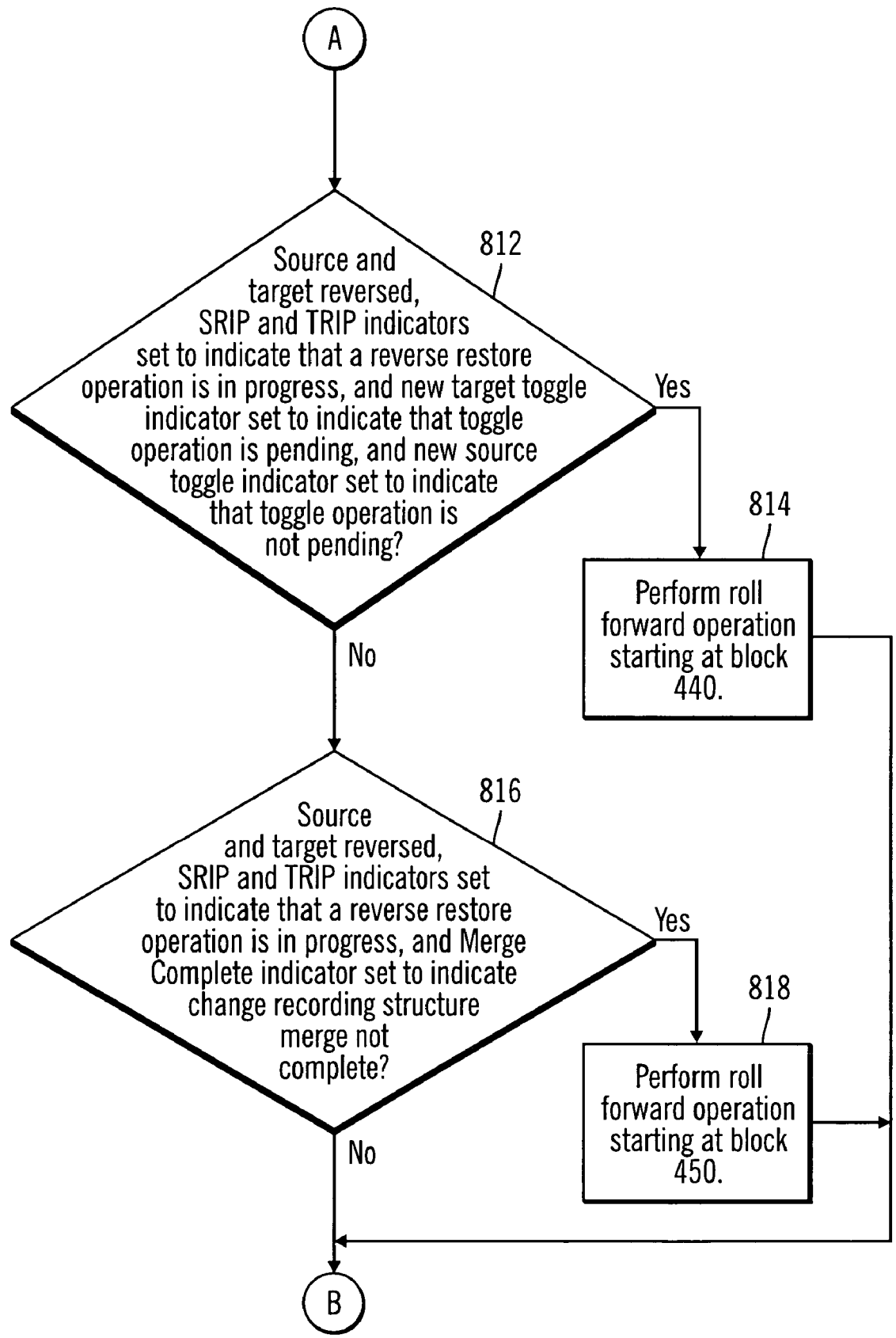
Figure 8C:
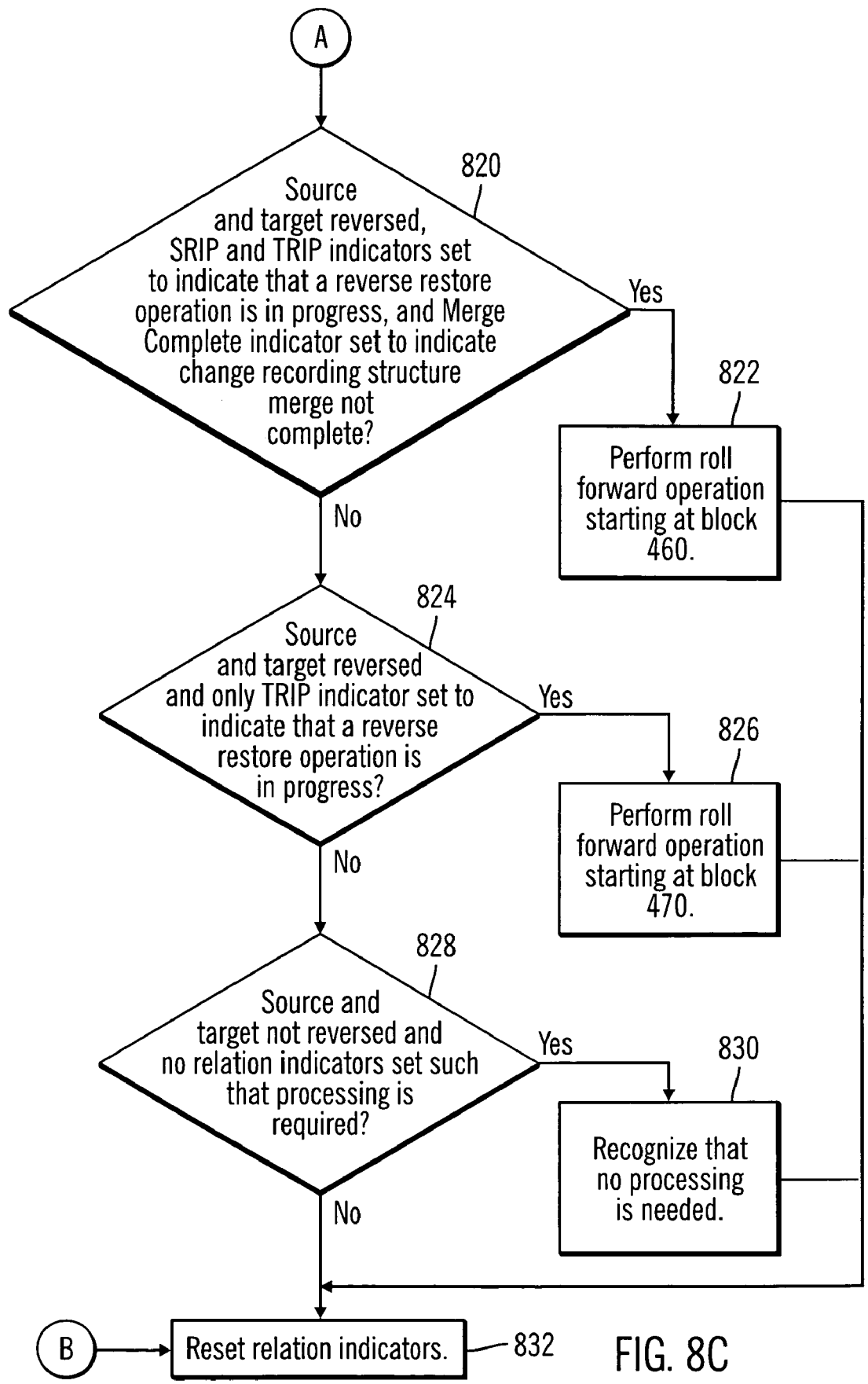

When portions (e.g., storage, volumes, tracks, sectors, etc.) of data in the source storage 120 are originally treated as source portions of data, and portions of data in the target storage 130 are originally treated as target portions of data, a reversal of the designations of source and target treats the portions of data in the target storage 130 as source portions of data and treats the portions of data in the source storage 120 as the target portions of data. Then, copying is performed from the new source to the new target (e.g., from storage 130 to storage 120). When the indication of which portions of data are to be treated as source and target is reversed, for ease of reference, the portions of data that are to be treated as source may be referred to as "new source" portions of data (e.g., new source storage or new source block of data), and the portions of data that are to be treated as target may be referred to as "new target" portions of data (e.g., new target storage or new target block of data). Moreover, if there is an interruption in the processing of FIG. 4, the reverse restore operation, the logic of FIGS. 8A, 8B, and 8C is performed.

In block 410, the TRIP indicator 222 is set to indicate that a reverse restore operation is in progress for a new source (i.e., the original target), and a toggle indicator 214 for the new source (also referred to as "a new source toggle indicator") is set to indicate that a toggle operation is pending for the new source. At this time, the setting of the SRIP indicator 212 indicates that a reverse restore operation is not in progress for the new target (i.e., the original source). In block 420, the SRIP indicator 212 is set to indicate that a reverse restore operation is in progress for a new target (i.e., the original source), and a toggle indicator 214 for the new target (also referred to as "a new target toggle indicator") is set to indicate that a toggle operation is pending for the new target. The SRIP indicator 212 is set when processing a reverse restore for the original source relation entry by updating the relation entry, and the TRIP indicator 222 is set when processing a reverse restore for the original target relation entry by updating the relation entry. A source relation entry holds information about the source, such as identifying a corresponding target. A target relation entry holds information about the target, such as identifying a corresponding source.

In block 430, the reverse restore process 117 updates indicators in the source change recording structure 210 for the new source to indicate that the new source blocks of data have not been updated since the last copy operation (e.g., incremental virtual copy operation or reverse restore operation) and updates the toggle indicator for the new source to indicate that a toggle operation is not pending for the new source and that a copy of the source change recording structure 210 was made before updating the source change recording structure 210. In certain implementations of the invention, all of the indicators in the source change recording structure 210 are set to zero.

In block 440, the reverse restore process 117 updates the indicators in the target change recording structure 220 for the new target to indicate that the new target blocks of data have not been updated since the last copy operation (e.g., incremental virtual copy operation or reverse restore operation) and updates the toggle indicator for the new target to indicate that a toggle operation is not pending for the new target and that a copy of the target change recording structure 220 was made before updating the target change recording structure 220. In certain implementations of the invention, all of the indicators in the target change recording structure 220 are set to zero.

In block 450, the reverse restore process 117 updates indicators in the new target copy structure 200 for the new target with indicators in the copies of the new source and new target change recording structures 210 and 220 and a merge complete indicator 216 is set to indicate that a merge is complete. In certain implementations of the invention, the copy of the source change recording structure 210 is merged with the copy of the target change recording structure 220 using an "OR" operation, and the result of the "OR" operation is stored in the target copy structure 200.

In block 460, the reverse restore process 117 updates an indication that the original source is acting as the new target and sets the SRIP indicator 212 to indicate that a reverse restore operation is not in progress. In block 470, the reverse restore process 117 updates an indication that the original target is acting as the new source and sets the TRIP indicator 222 to indicate that a reverse restore operation is not in progress.

Figure 5:
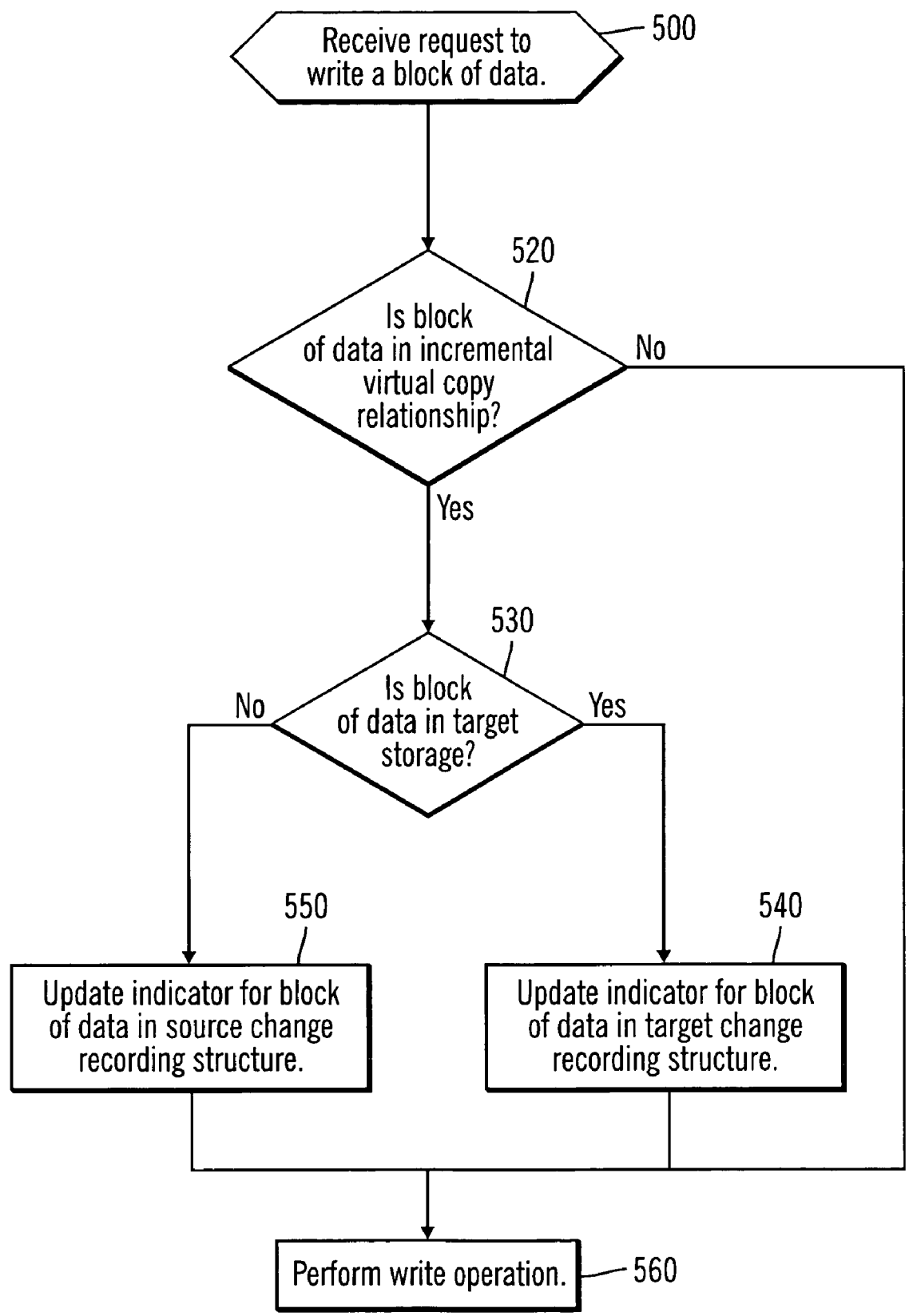
FIG. 5 illustrates logic implemented in write process for processing of a write operation in accordance with certain implementations of the invention.

FIG. 5 illustrates logic implemented in write process 114 for processing of a write operation in accordance with certain implementations of the invention. Control begins at block 500 with the write process 114 receiving a request to write a block of data. In block 520, the write process 114 determines whether the block of data is in an incremental virtual copy relationship. If so, processing continues to block 530, otherwise, processing continues to block 560. In block 530, the write process 114 determines whether the block of data is in target storage (which may be either storage 120 or 130, depending on the designation of source and target). If so, processing continues to block 540, otherwise, processing continues to block 550.

In block 540, the indicator for the block of data in the target change recording structure 220 is updated to indicate that the target block of data has changed since the last copy operation (e.g., incremental virtual copy operation). In certain implementations of the invention, the indicator in the target change recording structure 220 is set to one. In block 550, the indicator for the block of data in the source change recording structure 210 is updated to indicate that the source block of data has changed since the last copy operation (e.g., incremental virtual copy operation). In certain implementations of the invention, the indicator in the source change recording structure 210 is set to one. In block 560, the write operation is performed by the write process 114.

Figure 6:
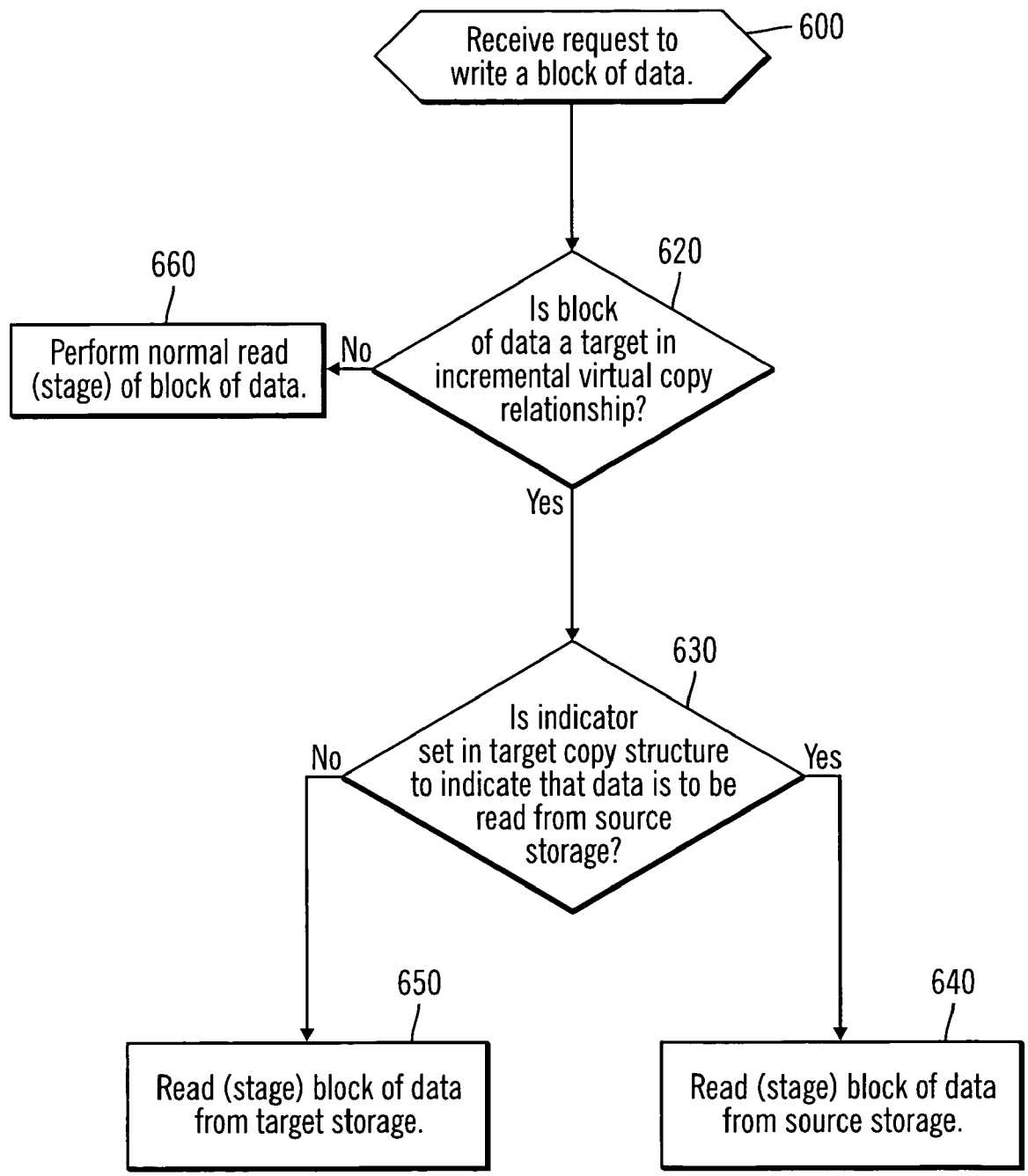
FIG. 6 illustrates logic implemented in the read process for processing of a read operation in accordance with certain implementations of the invention.

FIG. 6 illustrates logic implemented in the read process 112 for processing of a read operation in accordance with certain implementations of the invention. Control begins at block 600 with receipt of a request to read a block of data. In block 620, the read process 112 determines whether the block of data is a target in an incremental virtual copy relationship. If so, processing continues to block 630, otherwise, processing continues to block 660. In block 630, the read process determines whether an indicator for the block of data is set in the target copy structure to indicate that data is to be read from source storage 120. If so, processing continues to block 640, otherwise, processing continues to block 650.

In block 640, the read process 112 reads (i.e., stages) the block of data from source storage 120. In block 650, the read process 112 reads (i.e., stages) the block of data from target storage 130. In block 660, the read process 112 performs a normal read of the block of data.

Figure 7:
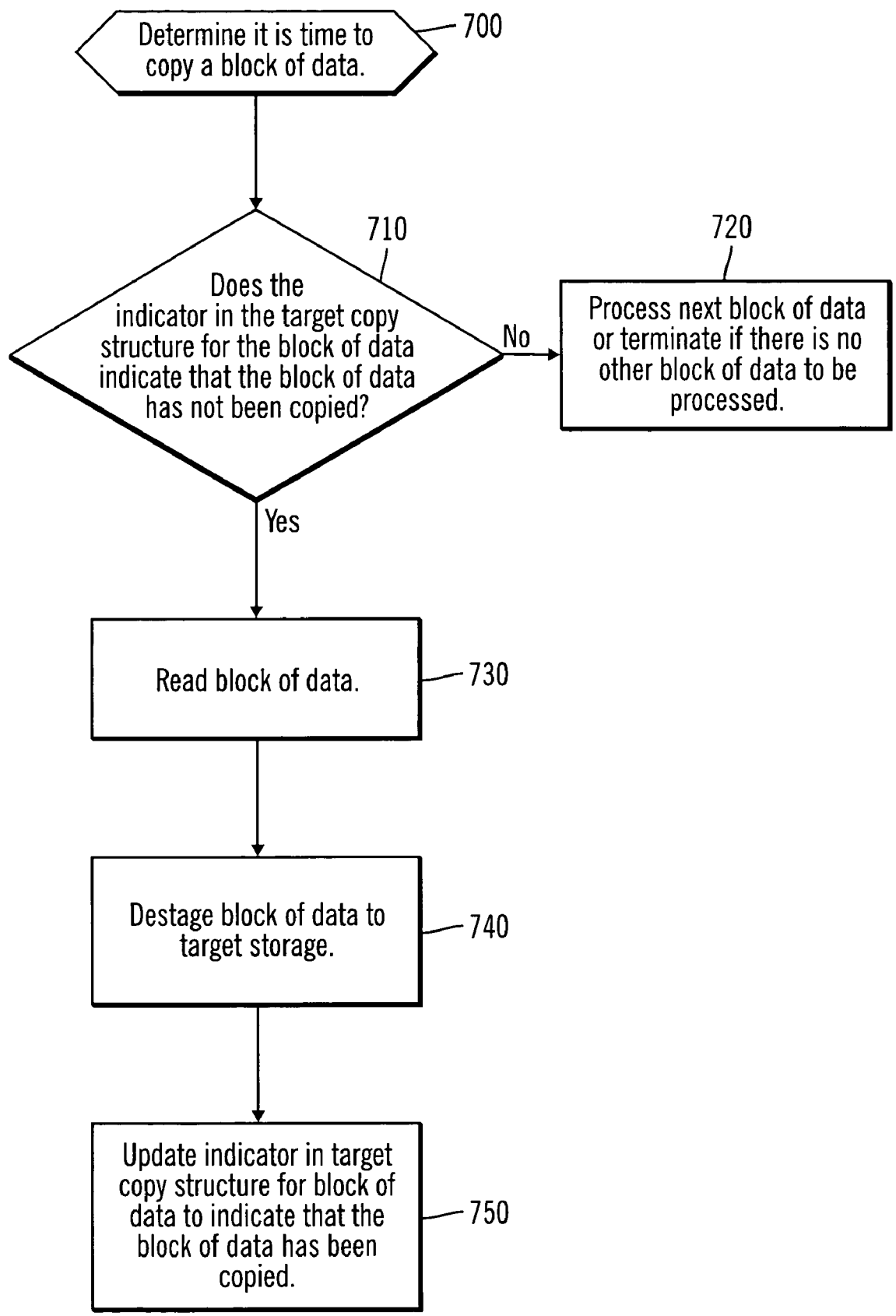
FIG. 7 illustrates a background copy process in accordance with certain implementations of the invention.

FIG. 7 illustrates a background copy process in accordance with certain implementations of the invention. Control begins at block 700 with a determination that it is time to copy a block of data. In block 710, it is determined whether the indicator in the target copy structure 200 for the block of data indicates that the block of data has not been copied. If so, processing continues to block 730, otherwise processing continues to block 720. In block 720, a next block of data may be processed or, if there are no other blocks of data to be processed, this logic terminates.

In block 730, the block of data is read in accordance with the logic of FIG. 6. In block 740, the block of data is destaged to target storage (which may be either storage 120 or 130, depending on the designation of source and target). In block 750, an indicator in the target copy structure 200 is updated for the block of data to indicate that the block of data has been copied. In certain implementations of the invention, the indicator in the target copy structure 200 is set to zero.

FIGS. 8A, 8B, and 8C illustrate logic implemented in a reverse restore recovery process in accordance with certain implementations of the invention. In the example illustrated with FIGS. 8A, 8B, and 8C, source storage 120 is initially designated as a source (i.e., "original source"), and target storage 130 is initially designated as a target (i.e., "original target").

The logic of FIGS. 8A, 8B, and 8C will be described with reference to FIG. 9, which illustrates a table 900 describing states and recovery actions in accordance with certain implementations of the invention. For the example described herein, volume A of table 900 is designated as an original source volume, and volume B is designated as an original target volume. In particular, table 900 includes a column for a row identifier (e.g., a number), an indication of whether volume A (e.g., a source volume) is a source or target, an indication of whether any relation indicators are currently set for volume A, an indication of whether a volume B (e.g., a target volume) is a source or target, an indication of whether any relation indicators are currently set for volume B, and recovery actions that are performed based on the indications.

Control begins in block 800 with recognition that the reverse restore operation has been interrupted. In block 802, if it is determined that the source and target have not been reversed yet and no relation indicators have been set such that processing is required (e.g., set as indicated in following blocks 804-832), processing is done, otherwise, processing continues to block 804. In particular, when the SRIP and TRIP indicators have been set to indicate that a reverse restore operation is not in progress and a merge complete indicator is set to indicate that merging of the change recording structures is complete, it is determined that the relation indicators are set such that processing is not required. For example, in row 1 of table 900, volume A is initially designated as a source, volume B is initially designated as a target, no relation indicators have been set to first values, and no action is required.

In block 804, if the designation of the original source is not reversed, the designation of the original target is reversed, a SRIP indicator is set to indicate that a reverse restore operation is not in progress, a TRIP indicator is set to indicate that a reverse restore operation is in progress, and a new source toggle indicator is set to indicate that a toggle operation is pending, processing continues to block 806, otherwise, processing continues to block 808. In block 806, a roll back operation is performed, and the original target is designated as a target. A roll back operation "rolls back" processing that has occurred. Additionally, since the designation of the original target was reversed (i.e., set to source), this designation is again reversed. For example, in row 2 of table 900, the designation of volume A has not been reversed (i.e., volume A is still a source), the designation of volume B has been reversed so that volume B is a source, the TRIP indicator is set to indicate that a reverse restore operation is in progress, and the new source indicator for volume B has been set to indicate that a toggle operation is pending. Then, a roll back operation is performed, and volume B is designated as a target.

A toggle operation resets indicators in the change recording structures to indicate that no changes to the source and target have occurred since the last copy operation (e.g., incremental virtual copy operation or reverse restore operation). In particular, in order to correctly recover from a reverse restore operation that was interrupted, implementations of the invention determine whether the change recording structures were toggled. Therefore, before the roll forward point, a call to "prepare to toggle" is issued to both the source and target change recording structures, and this sets a toggle indicator to indicate that a toggle operation is pending. Once the change recording structure has been reset, the corresponding toggle indicator is set to indicate that the toggle operation is complete. When recovery of the interruption is performed, a check of the toggle indicator and the merge complete indicator is used to determine whether the toggle operation has completed. When a toggle indicator is set to indicate that a toggle operation is not pending and a merge complete indicator is set to indicate that merging is not complete, then it is determined that a toggling operation has completed.

Moreover, the toggle indicator for the source change recording structure is set when the TRIP indicator is set to indicate that reversal of the target is in progress. The recovery of the incremental virtual copy relationship toggles the source change recording structure after the roll forward point.

In block 808, if the designation of the original source and original target have been reversed, the SRIP and TRIP indicators have been set to indicate that a reverse restore operation of both source and target is in progress, and both a new source toggle indicator and a new target toggle indicator are set to indicate that a toggle operation is pending, processing continues to block 810, otherwise, processing continues to block 812. In block 810, a roll forward operation is performed, starting with the processing of block 430 in FIG. 4. For example, in row 3 of table 900, the designation of volume A has been reversed to target, the SRIP indicator is set to indicate that a reversal of the original source is in progress, the new target toggle indicator is set to indicate that a toggle operation is pending, the designation of volume B has been reversed to source, the TRIP indicator is set to indicate that a reversal of the original target is in progress, and the new source toggle indicator is set to indicate that a toggle operation is pending. Then, a roll forward operation is performed, starting with the processing of block 430 in FIG. 4.

In block 812, if the designation of the original source and original target have been reversed, the SRIP and TRIP indicators have been set to indicate that a reverse restore operation of both source and target is in progress, a new target toggle indicator is set to indicate that a toggle operation is pending, and a new source toggle indicator is set to indicate that a toggle operation is not pending, processing continues to block 814, otherwise, processing continues to block 816. In block 814, a roll forward operation is performed, starting with the processing of block 440 in FIG. 4. For example, in row 4 of table 900, the designation of volume A has been reversed to target, the SRIP indicator is set to indicate that a reversal of the original source is in progress, the new target toggle indicator is set to indicate that a toggle operation is pending, the designation of volume B has been reversed to source, the TRIP indicator is set to indicate that a reversal of the original target is in progress, and the new source toggle indicator is set to indicate that a toggle operation is not pending. Then, a roll forward operation is performed, starting with the processing of block 440 in FIG. 4.

In block 816, if the designation of the original source and original target have been reversed, the SRIP and TRIP indicators have been set to indicate that a reverse restore operation of both source and target is in progress, and a merge complete indicator is set to indicate that merging of the change recording structures is not complete, processing continues to block 818, otherwise, processing continues to block 820. In block 818, a roll forward operation is performed, starting with the processing of block 450 in FIG. 4.

In certain implementations of the invention, once the TRIP indicator is set in the target relation entry to indicate that a reverse restore operation is in progress, the roll forward point is reached. In certain implementations of the invention, if the reverse restore operation is interrupted by error after passing the roll forward point, the new target relation entry is recovered before the recovery of a new source relation entry.

For example, in row 5 of table 900, the designation of volume A has been reversed to target, the SRIP indicator is set to indicate that a reversal of the original source is in progress, the designation of volume B has been reversed to source, and the TRIP indicator is set to indicate that a reversal of the original target is in progress. Then, a roll forward operation is performed, starting with the processing of block 450 in FIG. 4.

In block 820, if the designation of the original source and original target have been reversed, the SRIP and TRIP indicators have both been set to indicate that a reverse restore operation is in progress, and a merge complete indicator is set to indicate that merging of the change recording structures is complete, processing continues to block 822, otherwise, processing continues to block 824. In block 822, a roll forward operation is performed, starting with the processing of block 460 in FIG. 4.

For example, in row 6 of table 900, the designation of volume A has been reversed to target, the SRIP indicator is set to indicate that a reverse restore operation is in progress, the merge complete indicator is set to indicate that the merge is complete, the designation of volume B has been reversed to source, and the TRIP indicator is set to indicate that a reverse restore operation is in progress. Then, a roll forward operation is performed, starting with the processing of block 460 in FIG. 4.

In block 824, if the designation of the original source and original target have been reversed, the SRIP indicator is set to indicate that a reverse restore operation is not in progress, and the TRIP indicator has been set to indicate that a reverse restore operation is in progress, processing continues to block 826, otherwise, processing continues to block 828. In block 826, a roll forward operation is performed, starting with the processing of block 470 in FIG. 4. For example, in row 7 of table 900, the designation of volume A has been reversed to target, the SRIP indicator is set to indicate that a reverse restore operation is not in progress, the designation of volume B has been reversed to source, and the TRIP indicator is set to indicate that a reverse restore operation is in progress. Then, a roll forward operation is performed, starting with the processing of block 470 in FIG. 4.

In block 828, if the designation of the original source and original target have been reversed, and no relation indicators are set such that processing is required (e.g., set as indicated in preceding blocks 804–832), processing continues to block 830, otherwise, processing continues to block 832. In block 830, it is recognized that no processing is needed. For example, in row 8 of table 900, the designation of source and target have been reversed, and no relation indicators are set, so no action is required.

In block 832, relation indicators are reset as needed. For example, the SRIP indicator 212 and TRIP indicator 222 may be reset to indicate that a reverse restore operation is not in progress. For example, in row 8 of table 900, the designation of volume A has been reversed to target, the designation of volume B has been reversed to source, and no relation indicators have been set to first values. No action is required for these states.

Thus, in certain implementations of the invention, the reverse restore operation is achieved by monitoring writes (i.e., updates) and recording changes to tracks for volumes participating in an incremental virtual copy relationship. After an initial incremental virtual copy operation, the direction of the incremental virtual copy operation may be reversed and tracks that have been updated on either a source or a target volume may be copied from the original target volume to the original source volume, without copying the entire original target volume. Implementations of the invention provide recovery of a reverse restore operation. That is, when the reverse restore operation is interrupted by some type of error event (e.g., hardware and/or software failures), implementations of the invention provide recovery by either undoing the operation and restoring the status of data to its original state (e.g., by performing a roll back operation) or by completing the reverse restore operation (e.g., by performing a roll forward operation).

Enterprise Storage Server, FlashCopy, and 3990 are registered trademarks or common law marks of International Business Machines Corporation in the United States and/or other countries.

Additional Implementation Details

The described techniques for recovery of a reverse restore operation may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The term "copy operation" herein may refer to various types of operations, including, for example: establishing an incremental virtual copy relationship, "incrementing" an incremental virtual copy operation, or "reverse restoring" an incremental virtual copy relationship.

The logic of FIGS. 3, 4, 5, 6, 7, 8A, 8B, and 8C describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3, 4, 5, 6, 7, 8A, 8B, and 8C may be implemented in software, hardware, programmable and non-programmable gate array logic or in some combination of hardware, software, or gate array logic.

Figure 10:
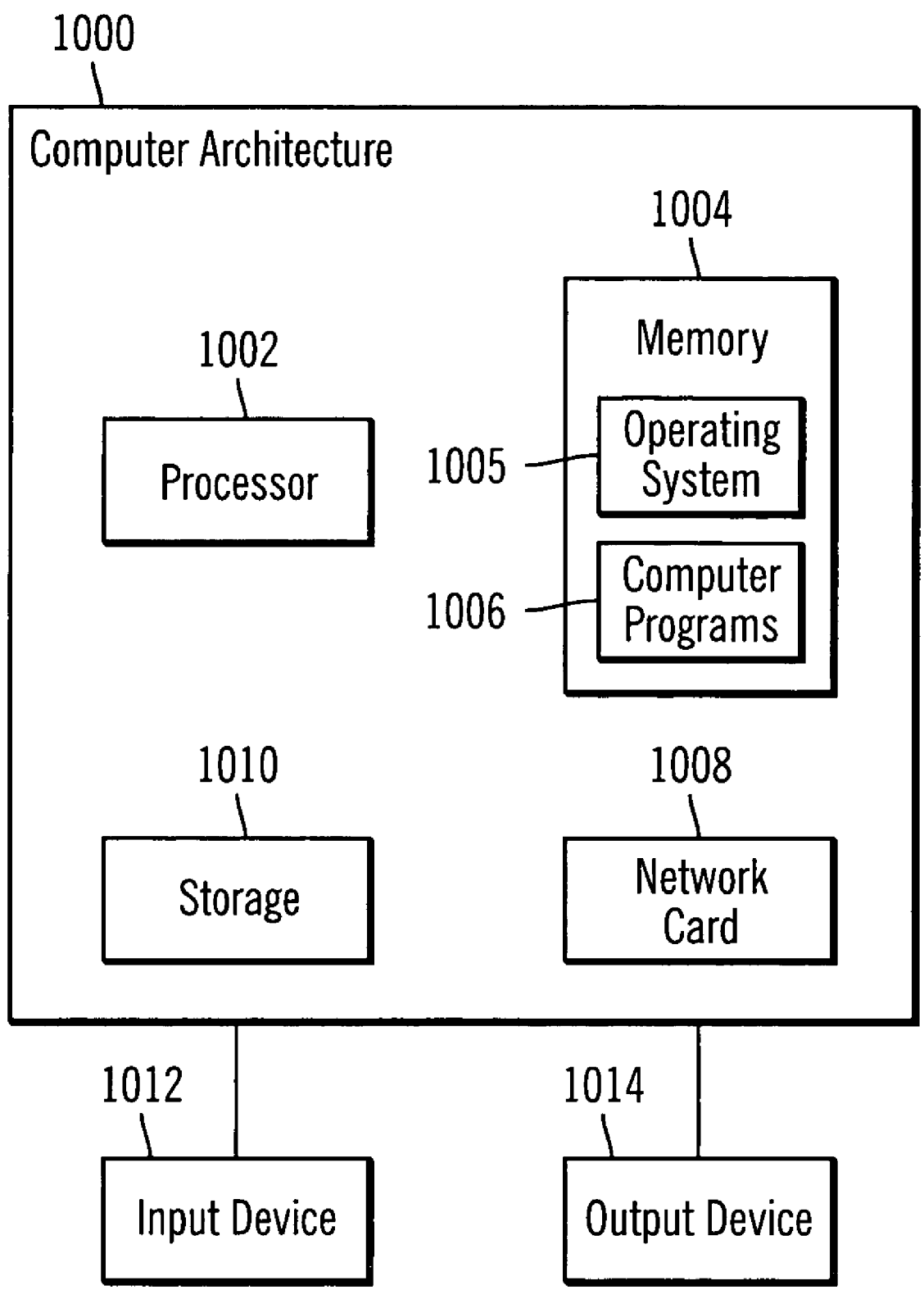
FIG. 10 illustrates an architecture of a computer system that may be used in accordance with certain implementations of the invention.

FIG. 10 illustrates an architecture of a computer system that may be used in accordance with certain implementations of the invention. A storage controller 100 and/or host 140 may implement computer architecture 1000. The computer architecture 1000 may implement a processor 1002 (e.g., a microprocessor), a memory 1004 (e.g., a volatile memory device), and storage 1010 (e.g., a non-volatile storage area, such as magnetic disk drives, optical disk drives, a tape drive, etc.). An operating system 1005 may execute in memory 1004. The storage 1010 may comprise an internal storage device or an attached or network accessible storage. Computer programs 1006 in storage 1010 may be loaded into the memory 1004 and executed by the processor 1002 in a manner known in the art. The architecture further includes a network card 1008 to enable communication with a network. An input device 1012 is used to provide user input to the processor 1002, and may include a keyboard, mouse, pen-stylus, microphone, touch sensitive display screen, or any other activation or input mechanism known in the art. An output device 1014 is capable of rendering information transmitted from the processor 1002, or other component, such as a display monitor, printer, storage, etc. The computer architecture 1000 of the computer systems may include fewer components than illustrated, additional components not illustrated herein, or some combination of the components illustrated and additional components.

The computer architecture 1000 may comprise any computing device known in the art, such as a mainframe, server, personal computer, workstation, laptop, handheld computer, telephony device, network appliance, virtualization device, storage controller, etc. Any processor 1002 and operating system 1005 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the. claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for processing interruption of an operation that transfers data between a source and a target, comprising:
   receiving an indication that a reverse restore operation has been interrupted;
   determining whether designation of at least one of an original source and an original target has been reversed;
   determining settings of one or more relation indicators;
   identifying processing to perform based on the determinations of whether designations have been reversed and based on the settings of the one or more relation indicators; and
   performing the identified process.

2. The method of claim 1, further comprising:
   if designations of the original source and the original target have not been reversed, identifying that no processing is required.

3. The method of claim 1, further comprising:
   if a source reversal in progress indicator is set to indicate that a reverse restore operation is not in progress, a target reversal in progress indicator is set to indicate that a reverse restore operation is in progress, and a new source toggle indicator is set to indicate that a toggle operation is pending, (i) performing a roll back operation; and (ii) setting the designation of the original target to be a target.

4. The method of claim 1, further comprising:

if a source reversal in progress indicator is set to indicate that a reverse restore operation is in progress, a new target toggle indicator is set to indicate that a toggle operation is pending, a target reversal in progress indicator is set to indicate that a reverse restore operation is in progress, and a new source toggle indicator is set to indicate that a toggle operation is pending, performing a roll forward operation starting from a first roll forward point; and if the source reversal in progress indicator is set to indicate that the reverse restore operation is in progress, the new target toggle indicator is set to indicate that the toggle operation is pending, the target reversal in progress indicator is set to indicate that the reverse restore operation is in progress, and the new source toggle indicator is set to indicate that the toggle operation is not pending, performing the roll forward operation starting from a second roll forward point.

5. The method of claim 1, further comprising:

if a source reversal in progress indicator and a target reversal in progress indicator are both set to indicate that a reverse restore operation is in progress, and a merge complete indicator is set to indicate that a merge of change recording structures is not complete, performing a roll forward operation starting from a first roll forward point; and if the source reversal in progress indicator and the target reversal in progress indicator are both set to indicate that the reverse restore operation is in progress, and the merge complete indicator is set to indicate that the merge of the change recording structures is complete, performing the roll forward operation starting from a second roll forward point.

6. The method of claim 1, further comprising:

if a source reversal in progress indicator is set to indicate that a reverse restore operation is not in progress and a target reversal in progress indicator is set to indicate that a reverse restore operation is in progress, performing a roll forward operation.

7. The method of claim 1, further comprising:

if a source reversal in progress indicator and a target reversal in progress indicator are both set to indicate that a reverse restore operation is not in progress, and a merge complete indicator is set to indicate that a merge of change recording structures is complete, identifying that no processing is required.

8. An article of manufacture comprising one of hardware logic and a computer readable medium for processing interruption of an operation that transfers data between a source and a target, wherein the article of manufacture causes operations, the operations comprising:

receiving an indication that a reverse restore operation has been interrupted;

determining whether designation of at least one of an original source and an original target has been reversed;

determining settings of one or more relation indicators;

identifying processing to perform based on the determinations of whether designations have been reversed and based on the settings of the one or more relation indicators; and performing the identified process.

9. The article of manufacture the limitation of "comprising one of hardware logic and a computer readable medium" of claim 8, the operations further comprising:

if designations of the original source and the original target have not been reversed, identifying that no processing is required.

10. The article of manufacture the limitation of "comprising one of hardware logic and a computer readable medium" of claim 8, the operations further comprising:

if a source reversal in progress indicator is set to indicate that a reverse restore operation is not in progress, a target reversal in progress indicator is set to indicate that a reverse restore operation is in progress, and a new source toggle indicator is set to indicate that a toggle operation is pending, (i) performing a roll back operation; and (ii) setting the designation of the original target to be a target.

11. The article of manufacture the limitation of "comprising one of hardware logic and a computer readable medium" of claim 8, the operations further comprising:

if a source reversal in progress indicator is set to indicate that a reverse restore operation is in progress, a new target toggle indicator is set to indicate that a toggle operation is pending, a target reversal in progress indicator is set to indicate that a reverse restore operation is in progress, and a new source toggle indicator is set to indicate that a toggle operation is pending, performing a roll forward operation starting from a first roll forward point; and if the source reversal in progress indicator is set to indicate that the reverse restore operation is in progress, the new target toggle indicator is set to indicate that the toggle operation is pending, the target reversal in progress indicator is set to indicate that the reverse restore operation is in progress, and the new source toggle indicator is set to indicate that the toggle operation is not pending, performing the roll forward operation starting from a second roll forward point.

12. The article of manufacture the limitation of "comprising one of hardware logic and a computer readable medium" of claim 8, the operations further comprising:

if a source reversal in progress indicator and a target reversal in progress indicator are both set to indicate that a reverse restore operation is in progress, and a merge complete indicator is set to indicate that a merge of change recording structures is not complete, performing a roll forward operation starting from a first roll forward point; and if the source reversal in progress indicator and the target reversal in progress indicator are both set to indicate that the reverse restore operation is in progress, and the merge complete indicator is set to indicate that the merge of the change recording structures is complete, performing the roll forward operation starting from a second roll forward point.

13. The article of manufacture the limitation of "comprising one of hardware logic and a computer readable medium" of claim 8, the operations further comprising:

if a source reversal in progress indicator is set to indicate that a reverse restore operation is not in progress and a target reversal in progress indicator is set to indicate that a reverse restore operation is in progress, performing a roll forward operation.

14. The article of manufacture the limitation of "comprising one of hardware logic and a computer readable medium" of claim 8, the operations further comprising:

if a source reversal in progress indicator and a target reversal in progress indicator are both set to indicate that a reverse restore operation is not in progress, and a merge complete indicator is set to indicate that a merge of change recording structures is complete, identifying that no processing is required.

15. A system for processing interruption of an operation that transfers data between a source and a target, comprising:

means for receiving an indication that a reverse restore operation has been interrupted;

means for determining whether designation of at least one of an original source and an original target has been reversed;

means for determining settings of one or more relation indicators; and means for identifying processing to perform based on the determinations of whether designations have been reversed and based on the settings of the one or more relation indicators.

16. The system of claim 15, further comprising:

if a source reversal in progress indicator is set to indicate that a reverse restore operation is not in progress, a target reversal in progress indicator is set to indicate that a reverse restore operation is in progress, and a new source toggle indicator is set to indicate that a toggle operation is pending, (i) means for performing a roll back operation; and
(ii) means for setting the designation of the original target to be a target.

17. The system of claim 15, further comprising:

if a source reversal in progress indicator is set to indicate that a reverse restore operation is in progress, a new target toggle indicator is set to indicate that a toggle operation is pending, a target reversal in progress indicator is set to indicate that a reverse restore operation is in progress, and a new source toggle indicator is set to indicate that a toggle operation is pending, means for performing a roll forward operation starting from a first roll forward point; and if the source reversal in progress indicator is set to indicate that the reverse restore operation is in progress, the new target toggle indicator is set to indicate that the toggle operation is pending, the target reversal in progress indicator is set to indicate that the reverse restore operation is in progress, and the new source toggle indicator is set to indicate that the toggle operation is not pending, means for performing the roll forward operation starting from a second roll forward point.

18. The system of claim 15, further comprising:

if a source reversal in progress indicator and a target reversal in progress indicator are both set to indicate that a reverse restore operation is in progress, and a merge complete indicator is set to indicate that a merge of change recording structures is not complete, means for performing a roll forward operation starting from a first roll forward point; and if the source reversal in progress indicator and the target reversal in progress indicator are both set to indicate that the reverse restore operation is in progress, and the merge complete indicator is set to indicate that the merge of the change recording structures is complete, means for performing the roll forward operation starting from a second roll forward point.

19. The system of claim 15, further comprising:

if a source reversal in progress indicator is set to indicate that a reverse restore operation is not in progress and a target reversal in progress indicator is set to indicate that a reverse restore operation is in progress, means for performing a roll forward operation.

20. The system of claim 15, further comprising:

if a source reversal in progress indicator and a target reversal in progress indicator are both set to indicate that a reverse restore operation is not in progress, and a merge complete indicator is set to indicate that a merge of change recording structures is complete, means for identifying that no processing is required.

* * * * *